(12) United States Patent
Gill (10) Patent No.: US 8,807,954 B2
(45) Date of Patent: Aug. 19, 2014

(54) ASSEMBLY AND METHOD OF PREPARING AN ASSEMBLY

(75) Inventor: Adrian Gill, East Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 688 days.

(21) Appl. No.: 13/059,805

(22) PCT Filed: Aug. 19, 2009

(86) PCT No.: PCT/EP2009/060723
§ 371 (c)(1),
(2), (4) Date: Feb. 22, 2011

(87) PCT Pub. No.: WO2010/023140
PCT Pub. Date: Mar. 4, 2010

(65) Prior Publication Data
US 2011/0142663 A1    Jun. 16, 2011

Related U.S. Application Data

(60) Provisional application No. 61/091,539, filed on Aug. 25, 2008.

(30) Foreign Application Priority Data

Aug. 25, 2008  (DK) ................................. 2008 01161

(51) Int. Cl.
| | | |
|---|---|---|
| *F01D 5/14* | (2006.01) | |
| *F03D 1/06* | (2006.01) | |
| *B29C 65/00* | (2006.01) | |
| *F16B 11/00* | (2006.01) | |
| *B29L 31/08* | (2006.01) | |
| *B29C 65/48* | (2006.01) | |
| *B29C 65/50* | (2006.01) | |

(52) U.S. Cl.
CPC ......... *F03D 1/0675* (2013.01); *B29C 66/43441* (2013.01); *F16B 11/006* (2013.01); *B29C 66/116* (2013.01); *B29C 66/636* (2013.01); *F05B 2230/23* (2013.01); *B29L 2031/085* (2013.01); *B29C 65/48* (2013.01); *B29L 2031/082* (2013.01); *B29C 66/1162* (2013.01); *B29C 66/1122* (2013.01); *B29C 65/5042* (2013.01); *B29C 66/112* (2013.01); *Y02E 10/721* (2013.01); *B29C 66/721* (2013.01); *B29C 66/54* (2013.01); *B29C 66/43421* (2013.01); *B29C 66/61* (2013.01); *B29C 66/324* (2013.01)
USPC ................................... 416/229 R; 29/525.13

(58) Field of Classification Search
USPC ......... 416/226, 229 R, 230, 241 A, 232, 233; 29/889.7, 525.13
See application file for complete search history.

(56) References Cited

U.S. PATENT DOCUMENTS

| | | |
|---|---|---|
| 5,205,868 A | 4/1993 | Anglin |
| 2003/0116262 A1 | 6/2003 | Stiesdal et al. |
| 2007/0175568 A1 | 8/2007 | Wang et al. |
| 2008/0075603 A1 * | 3/2008 | Van Breugel et al. ........ 416/232 |
| 2009/0226702 A1 * | 9/2009 | Madsen et al. ............. 428/317.1 |

FOREIGN PATENT DOCUMENTS

| | | |
|---|---|---|
| DE | 34 09 960 A1 | 10/1984 |
| DE | 35 36 806 A1 | 4/1987 |
| DE | 103 46 109 | 4/2005 |
| EP | 0 433 513 A1 | 6/1991 |
| EP | 0 859 705 A1 | 8/1998 |
| EP | 0 901 442 A1 | 3/1999 |
| JP | 59-87068 * | 5/1984 |
| WO | 00/27661 A1 | 5/2000 |
| WO | 2009/062507 | 5/2009 |

OTHER PUBLICATIONS

Carsten Huusom; International Search Report issued in priority international Application No. PCT/EP2009/060723; Oct. 28, 2009; 4 pages; European Patent Office.

Jens Skou; 1st Technical Examination report issued in priority Denmark Application No. PA 2008 01161; Apr. 6, 2009; 3 pages; Denmark Patent and Trademark Office.

* cited by examiner

*Primary Examiner* — Edward Look
*Assistant Examiner* — William Grigos
(74) *Attorney, Agent, or Firm* — Wood, Herron & Evans, LLP (57) ABSTRACT

The invention relates to a method of preparing an assembly, including providing a first structure; providing a second structure; providing at least one flexible adhesive limiting member extending between the structures; and providing an adhesive between the structures to bind the structures to each other; wherein the adhesive is limited by the flexible adhesive limiting member such that a concave front line surface of the adhesive is defined. The invention also relates to such an assembly as well as to a wind turbine rotor blade, and to a wind turbine, having such an assembly.

13 Claims, 5 Drawing Sheets

ASSEMBLY AND METHOD OF PREPARING AN ASSEMBLY

TECHNICAL FIELD

The present invention generally relates to a method of preparing an assembly comprising a first and a second structure, the structures being bound to each other by means of an adhesive, as well as to such an assembly, and to a wind turbine rotor blade and a wind turbine comprising such an assembly.

BACKGROUND OF THE INVENTION

When preparing a joint, i.e. joining two or more structures by means of an adhesive, using a liquid adhesive, such as a glue, it may be difficult to achieve a notch free front line surface of the adhesive bond line, wherein the front line surface is the interface between the adhesive and a surrounding medium, the interface extending between the structures from one structure to the other structure at an end of the joint. This is often due to the liquid adhesive spilling outward from the joint, forming a convex front of the bond line, i.e. a bond line front bulging outward from the bulk of adhesive in the joint and into the medium surrounding the joint such as air. If such spilling occur, notches are likely to form at the interface between the adhesive and each of the structures joined by the adhesive at the bond line front where sharp corners are formed. Notches are usually disadvantageous in a bond line front, since they may weaken the joint.

The problem with notches is specifically pronounced with respect to joints of wind turbines, and especially of wind turbine rotor blades, which are subjected to much stress over long periods of time. Wind turbine blades may be over 40 meters long and have a considerable weight, and must be able to withstand the strong and changing forces exerted by the wind for many years. As there is a need for ever larger blades to be provided to the market, the requirements for joints within the blades to be able to withstand even more stress are ever growing.

SUMMARY OF THE INVENTION

In view of the above, an objective of the invention is to provide a method of preparing an assembly, such as a joint, which is less prone to be weakened by notches.

According to one aspect, the present invention is realized by a method of preparing an assembly, comprising providing a first structure; providing a second structure; providing at least one flexible adhesive limiting member extending between the structures; and providing an adhesive between the structures to bind the structures to each other; wherein the adhesive is limited by the flexible adhesive limiting member such that a concave front line surface of the adhesive is defined.

By including a flexible adhesive limiting member that extends between the structures bound together forming the assembly, a distinct and concave front line surface of the adhesive may be achieved, i.e. the bond line front will not have sharp corners, forming notches, in the bond line front such as in the interface between the adhesive and any one of the structures.

The flexible adhesive limiting member may be positioned such that it limits the bond line in one direction in-between the structures, forming a front line surface of the bond line at the interface between the adhesive and the adhesive limiting member. The shape of this front line surface may thus be defined by the shape of the adhesive limiting member at the interface.

The flexible adhesive limiting member may limit the adhesive in at least one direction, whereby the member may function as a glue dam for the adhesive, thereby facilitating the preparation of the joint e.g. by limiting the adhesive to the area intended for the joint and keeping liquid adhesive from spilling to parts of any one of the structures where no adhesive is desired. By means of the flexible adhesive limiting member the adhesive may also be made to remain within the joint in an amount sufficient for forming a joint of desired strength and thickness even if e.g. pressure is applied to the adhesive whereby the adhesive might otherwise be pressed away from the joint. Of course, depending on the viscosity of the adhesive in a liquid form, the adhesive may be prone to spilling from the joint even without a pressure, in addition to gravity, being applied to the adhesive in the joint.

Since the adhesive limiting member is flexible, it may be pressed between the structures to form a convex shape at its interface with the adhesive, thus limiting the adhesive such that a distinct concave front line surface of the adhesive is formed. Thus, seen transversely across the adhesive front line, the front line bulges away from the flexible adhesive limiting member. Also, if the flexible adhesive limiting member is pressed between the structures, liquid adhesive introduced between the structures at preparation of the assembly may be pressed up against the adhesive limiting member without being allowed to pass the adhesive limiting member. The flexible adhesive limiting member may thus form a tight seal, with respect to the adhesive, between the structures at a front line surface of the adhesive.

By means of the adhesive limiting member extending between the structures, the adhesive will also be kept in place in the joint, resulting in reduced adhesive use for the assembly, such as a joint, since the adhesive does not flow out of the assembly. The adhesive cost may thus be reduced and excess adhesive present in undesired places between the structures bound together by the joint may be avoided.

The concavity of the adhesive front line surface, as viewed transversely across the front line surface, will specifically ensure that the adhesive, in the front line surface, meets each of the structures at an angle such that a notch, or interstice, is not formed in the interface between the adhesive front line surface and any one of the structures. If the front line surface was convex instead of concave, notches would be formed at the interfaces between the adhesive front line surface and the structures, weakening the assembly by making it susceptible to fatigue and separation of the assembly at said interfaces.

The adhesive limiting member may be designed such that it defines a distinct concave front line surface of the adhesive. If the front line surface is distinct, there will be no notches formed in the front line surface resulting from an indistinct, uneven or diffuse, front line surface. The adhesive limiting member will thus have an essentially smooth and regular surface which is in contact with the adhesive, without e.g. cracks, holes, edges, corners, hills, etc which induces notches in the adhesive front line surface. It is however to be understood that this effect is achieved provided the space defined between the structures and the adhesive limiting member is properly filled out with adhesive.

As a specific example, the adhesive limiting member will usually not be designed such that it may absorb the liquid adhesive during preparation of the joint, e.g. by the adhesive limiting member being porous. If, e.g., a sponge able to absorb the liquid adhesive is used, the front line surface would not be distinct. Rather, it would be coral formed as a result of the adhesive extending into the pores of the sponge. It is, however, understood that also the use of a porous material of the adhesive limiting member might provide a joint which is improved over prior art joints having notches or similar stress raisers. For example, the pores of a porous material may be too small for the adhesive used to be absorbed, e.g. depending on the viscosity of the adhesive.

If the front line surface is distinct, the front line surface will have an essentially smooth and well defined surface without any irregularities which may form sharp corners or notches in the front line surface. The front line surface will thus not be indistinct, uneven or diffuse.

It is appreciated that additional structures, such as a third structure, and/or additional adhesive limiting members, such as a second adhesive limiting member, may be comprised in the assembly of the inventive method.

The first and second structure may together with the flexible adhesive limiting member be arranged such that a channel is formed. This channel is then filled with the adhesive and guides and shapes the adhesive. Thus, the shape and positioning of the bond line, and of the adhesive front line surface, may be defined with high precision. Of course, the channel may be formed by more than two structures, and/or by more than one adhesive limiting member. Also, more than one channel may be formed.

It may be convenient to remove the flexible adhesive limiting member, from the assembly, after curing of the adhesive. The member will then not take up space in the assembly and not add to the weight of the assembly. Also, the adhesive limiting member may then be used again in another assembly.

The flexible adhesive limiting member may be attached to one of the structures and abut, during elastic deformation, another of the structures. The flexible adhesive limiting member may e.g. be attached to one of the structures, which structures are bound to each other in the assembly, by an adhesive, a double-sided tape or staples or the like. In this way, the preparation of the assembly may be facilitated. The flexible adhesive limiting member may then first be attached to one of the structures, after which liquid adhesive is applied to the structure and against the flexible adhesive limiting member, and then an other structure might be pressed against the adhesive and the flexible adhesive limiting member, which is elastically deformed and forms a seal between the two structures, to form an assembly in accordance with the present invention.

The flexible adhesive limiting member may be a flexible tubing. Depending on the shape and type of the assembly, a tubing may advantageously be used as the flexible adhesive limiting member in e.g. a lap joint.

A tubing may be easily attached to a surface of a structure to be bound in an assembly since a flexible tubing will have a surface which is essentially parallel to the surface of the structure while also having a convex surface facing the adhesive front line surface. Also, since the tubing has a convex surface in its non-deformed state, no special measures need to be taken in order to ensure that the flexible adhesive limiting member deforms against another structure to form a convex surface against the adhesive bond line during preparation of the inventive joint. If instead a planar flexible sheet, or strip, is used, one might have to make sure that the sheet does not deform to form a concave surface against the adhesive bond line, instead of a convex one, when it is elastically deformed against another structure.

The flexible adhesive limiting member may be produced from any suitable flexible material, such as from a closed cell foam. Examples include, but are not limited to, closed cell polyethylene and foamed nitrile rubber. Such materials may withstand temperatures for curing the adhesive, e.g. temperatures above 70° C.

The adhesive may be any suitable adhesive, such as a viscous liquid adhesive, including epoxy and polyurethane adhesives.

The assembly of the inventive method may form a joint. The joint may be any type of joint wherein at least two structures are bound by an adhesive, but the invention has been especially advantageous for different kinds of lap joints and butt joints.

The structures bound to each other in the assembly of the present invention may be any structures bound together by means of an adhesive, but the assembly has been especially advantageous for joints of wind turbines, especially joints in rotor blades of wind turbines. A wind turbine rotor blade may, depending on the design of the blade, comprise a spar, or beam, which is the backbone of the blade, and two shell members, supported by the spar and forming an airfoil. The two shell members may be arranged opposite one another longitudinally along respective sides of the spar and may be bound to each other in longitudinal joints at the leading and trailing edges of the blade. One or both of these joints may conveniently be in accordance with the assembly of the present invention. At the leading edge, the shell members may be bound to each other in a lap joint, and at the trailing edge, where the two shell members converge to form a "V", the shell members may be bound to each other in an other lap joint. Further, one or both of the shell members may be bound to the spar, spar cap or any part of the beam, depending on the design of the blade, in a butt joint in accordance with the assembly of the present invention.

According to another aspect, the present invention relates to an assembly comprising a first and a second structure, the structures being bound to each other by means of an adhesive, the adhesive having a concave front line surface.

The joint may further comprise a flexible adhesive limiting member extending between the structures and defining the concave front line surface of the adhesive.

According to another aspect, the present invention relates to a wind turbine rotor blade comprising an assembly according to the inventive assembly discussed above.

According to another aspect, the present invention relates to a wind turbine comprising an assembly according to the inventive assembly discussed above.

A typical wind turbine comprises, among other things, a tower, a nacelle, holding e.g. a generator and a transmission, and a rotor with rotor blades.

The discussion above in respect of the inventive method is in applicable parts also relevant to the inventive assembly, the inventive wind turbine rotor blade and the inventive wind turbine. Reference is made to that discussion.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

The term "flexible" in describing the adhesive limiting member of the present invention implies that the adhesive limiting member is able to be flexed or bent without breaking. The term also implies that the adhesive limiting member is capable of elastic deformation, as opposed to plastic deformation, wherein elastic deformation implies that the deformation is reversible and that the member will resume its original shape when the deforming force no longer affects it.

The term "front line surface" of the adhesive, or bond line, of the inventive joint relates to the surface of the adhesive facing a surrounding medium, such as air or the flexible adhesive limiting member, in-between two structures bound to each other by means of the adhesive. The surface extends between the two structures that are bound to each other by the adhesive, i.e. extends from a surface of one of the structures, which surface, at least to some extent, faces an opposing surface of the other structure, to the opposing surface of the other structure.

The term "distinct" in describing the front line surface of the adhesive of the inventive joint implies that the front line surface is clearly outlined and defined, and not diffuse, unclear, indistinct, etc. Thus, the distinct front line surface is a smooth surface, i.e. it does not have any notches.

The term "concave" in describing the front line surface of the adhesive of the inventive joint, implies that the front line surface, seen in a transversal cross section of the joint, bulges away from the flexible adhesive limiting member towards the centre of the bulk of the adhesive filling out the space formed between the structures and the flexible adhesive limiting member. Accordingly, the concavity is formed by the convex cross section of the flexible adhesive limiting member. The concavity of the front line surface is not necessarily symmetrical or parabolic/hyperbolic in shape. The front line surface may e.g. comprise a section between the two structures, which structures are bound to each other by the adhesive, which section is linear, as long as no notches or sharp corners are formed.

An lap joint will now be described with reference to FIGS. 1 and 2, wherein a joint is viewed as a transverse cross section.

Figure 1:
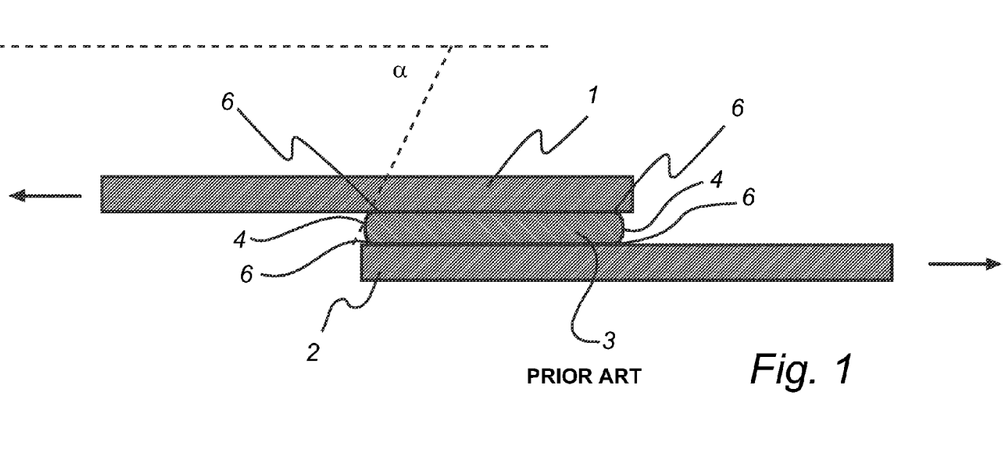
FIG. 1 is a schematic cross sectional view of a type of a lap joint of prior art.

FIG. 1 illustrates a regular prior art lap joint comprising two structures 1 and 2 which are bound to each other by an adhesive 3 forming a bond line. The lap joint is prepared by applying the adhesive 3 to an area of the second structure 2, after which the first structure 1 is provided overlapping the adhesive applied area of structure 2 and pressed against structure 2 to form the joint. The prepared joint is designed to withstand shearing forces as illustrated by the arrows in FIG. 1. In the preparation of this regular prior art lap joint, the adhesive, due to gravity and/or the pressure applied when pressing structures 1 and 2 together, spills outward from the joint to form convex front line surfaces 4, creating notches 6 where any one of the front line surfaces 4 meets any one of the structures 1 and 2 at an acute angle $\alpha$.

Figure 2:
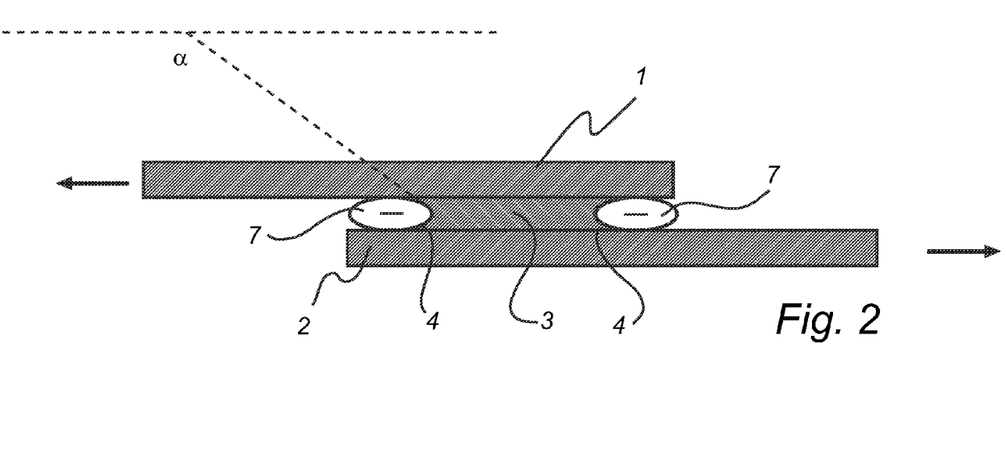
FIG. 2 is a schematic cross sectional view of the type of lap joint in FIG. 1 according to the invention.

FIG. 2 illustrates a lap joint in accordance with the present invention. Also this lap joint comprises structures 1 and 2, and adhesive 3, but additionally comprises the flexible tubings 7 functioning as flexible adhesive limiting members, or glue dams. The flexible tubings 7 extend between the structures 1 and 2 and along each longitudinal side of the joint and are pressed between the structures 1 and 2 during preparation of the joint. By using these tubings 7, each front line surface 4 is formed to be concave, instead of convex. That is, each of the front line surfaces 4 meets each of the structures 1 and 2 at an obtuse angle $\alpha$, whereby no notches are formed at the interfaces between the structures 1 and 2 and any one of the adhesive front line surfaces 4.

During preparation of the joint, the tubings 7 may be attached to the structure 2 by e.g. a double sided tape, glue or a staple. While the structure 1 is then pressed against the structure 2 and the adhesive 3 during preparation of the joint, the respective upper surfaces of the tubings 7 are contacted to the structure 1, whereby the tubings 7 are elastically deformed from an essentially circular cross section to an essentially elliptic cross section. Thus, the surfaces of the respective tubings 7 facing the adhesive 3 bulges outwards, towards the adhesive 3, forming the front line surfaces 4 of the adhesive 3 such that they are made concave.

The tubings 7 may be removed from the joint after the adhesive has assumed a solid form, provided that no notches are formed in the front line surfaces 4 during the removal, but it may be preferred to leave the tubings in the joint after its preparation in order to ensure that the front line surfaces are not disturbed, i.e. do not get any notches, and in order to simplify the preparation of the joint.

A different kind of lap joint will now be described with reference to FIGS. 3 and 4, wherein a joint is viewed as a transverse cross section. This lap joint is formed by two structures 1 and 2 converging and being bound to each other by means of an adhesive 3 where the structures 1 and 2 meet. This joint will primarily be subjected to splitting, or cleaving, forces, as indicated by the arrows.

Figure 3:
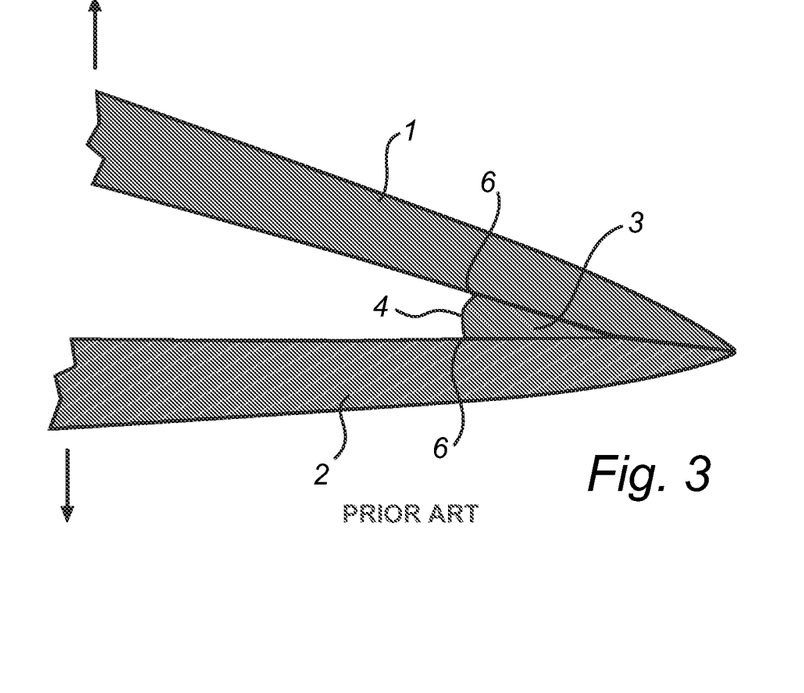
FIG. 3 is a schematic cross sectional view of an other type of lap joint of prior art.

FIG. 3 illustrates a regular lap joint comprising, similarly to the lap joint of FIG. 1, two structures 1 and 2 which are bound to each other by an adhesive 3 forming a bond line. The joint may be prepared by applying the adhesive 3 to an area of the structure 2, after which structure 1 may be provided mirror inverted to structure 2, contacting structure 2 at one end of structure 1 and covering the adhesive applied area of structure 2, and pressed against structure 2 to form the joint. This lap joint differs from the lap joint of FIG. 1 in that it is designed to withstand splitting forces, rather than shearing forces, as illustrated by the arrows. In the preparation of this regular prior art joint, the adhesive, due to gravity and/or the pressure applied when pressing structures 1 and 2 together, spills outward from the joint to form a convex front line surface 4, creating notches 6 where the front line surface 4 meets any one of the structures 1 and 2 at an acute angle (cf. .alpha. in FIG. 1).

Figure 4:
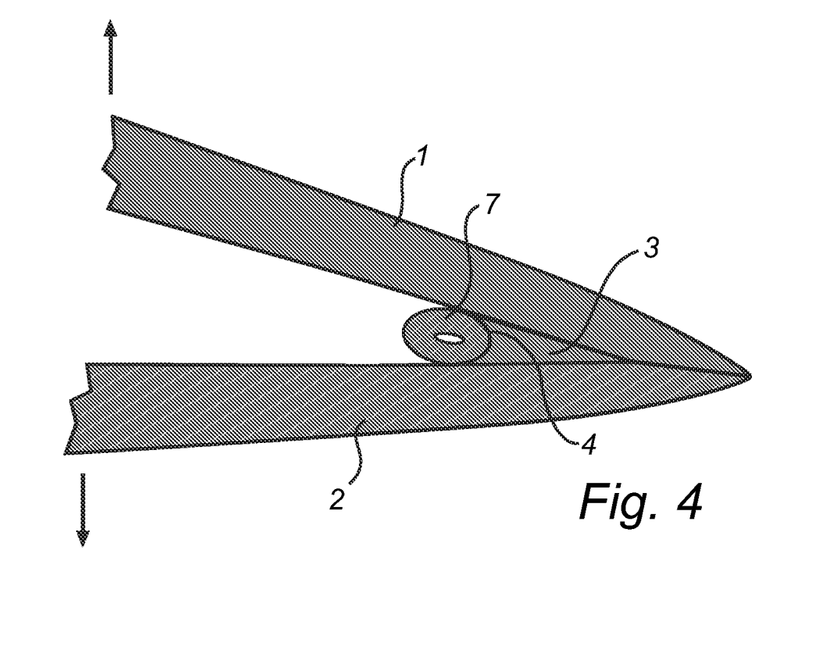
FIG. 4 is a schematic cross sectional view of the type of lap joint in FIG. 3 according to the invention.

FIG. 4 illustrates a joint in accordance with the present invention. Also this joint comprises structures 1 and 2, and adhesive 3, but additionally comprises the flexible tubing 7 functioning as a flexible adhesive limiting member, or glue dam, extending between the structures 1 and 2 and along the longitudinal side of the joint and pressed between the structures 1 and 2 during preparation of the joint. The two structures 1 and 2 in combination with the tubing 7 forms a channel which is filled with the adhesive 3 and guides and shapes this adhesive 3 to form the bond line of the joint. By using this tubing 7, the front line surface 4 is formed to be concave, instead of convex. The front line surface 4 meets each of the structures 1 and 2 at an obtuse angle (cf. $\alpha$ in FIG. 2), whereby no notches are formed at the interfaces between the structures 1 and 2 and the adhesive bond line surface 4.

During preparation of the joint, the tubing 7 may be attached to the structure 2 by e.g. a double sided tape, glue or a staple. As the structure 1 is then pressed against structure 2 and adhesive 3 during preparation of the joint, the upper surface of the tubing 7 is contacted to the structure 1, whereby the tubing 7 is elastically deformed from an essentially circular cross section to an essentially elliptic cross section, the surface of the tubing 7 facing the adhesive 3 bending outwards, towards the adhesive 3, forming the front line surface 4 of the adhesive 3 such that it is made concave.

The tubing 7 may be removed from the joint after the adhesive has assumed a solid form, provided that no notches are formed in the front line surface 4 during the removal, but it may be preferred to leave the tubing in the joint after its preparation in order to ensure that the front line surface is not disturbed, i.e. does not get any notches, and in order to simplify the preparation of the joint.

The tubings used in the inventive examples above may be made of any flexible material suitable for preparing a flexible tubing. In some cases a flexible cellular, or foam, material, such as a foamed polymeric material, may be advantageous. In order to ensure that the cellular material does not absorb the adhesive, the cells of the material are preferably closed. Suitable materials may e.g. be flexible closed cell polyethylene or foamed nitrile rubber. The cross sections of the tubings may be essentially circular, but may also have any other shape as long as they are able to bulge towards the adhesive to form a concave adhesive front line surface during preparation of the joint. Instead of a hollow structure, such as a tubing, a solid flexible structure, such as a circular cylinder, may be used as the flexible adhesive limiting member. This solid structure may of course also be made of a cellular material. In other applications of the present invention, see e.g. butt joints etc. below, other types of flexible adhesive limiting members, not tubings, may be employed.

A type of butt joint will now be described with reference to FIGS. 5 and 6, wherein a joint in a transversal cross section is viewed. This butt joint differs from a lap joint in that the surfaces of the structures 1 and 2 which are bound to each other in the joint, which surfaces are facing each other in the joint and are in contact with the adhesive, are not essentially parallel at an end of the joint. Instead, one of the surfaces curves away from the surface of the other structure at an end of the joint, i.e. at a front line surface of the adhesive, at about 90°. The joint could e.g. be a U-shaped structure bound to a flat surface.

Figure 5:
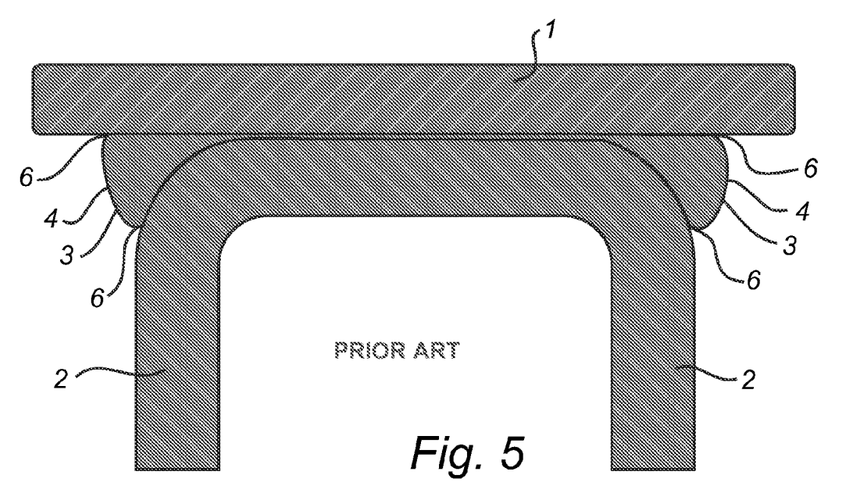
FIG. 5 is a schematic cross sectional view of a type of butt joint of prior art.

FIG. 5 illustrates a prior art butt joint comprising two structures 1 and 2 which are bound to each other by an adhesive 3 forming a bond line. The joint is prepared by applying the adhesive 3 to an area of the structure 2, after which structure 1 is provided covering the adhesive applied area of structure 2 and pressed against structure 2 to form the joint. In the preparation of this prior art joint, the adhesive, due to gravity and/or the pressure applied when pressing structures 1 and 2 together, spills outward from the joint to form a convex front line surface 4, creating notches 6 where the front line surface 4 meets any one of the structures 1 and 2 at an acute angle (cf. $\alpha$ in FIG. 1).

Figure 6:
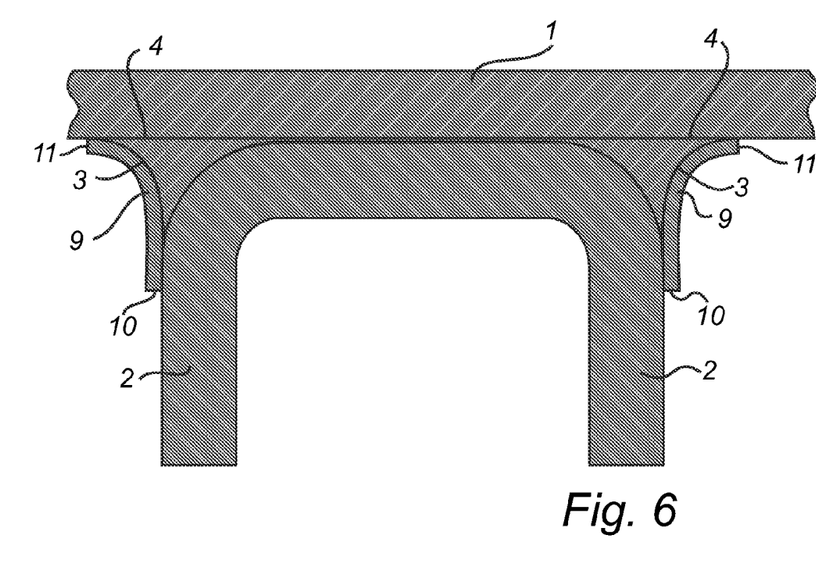
FIG. 6 is a schematic cross sectional view of the type of butt joint in FIG. 5 according to the invention.

FIG. 6 illustrates a butt joint in accordance with the present invention. Also this joint comprises structures 1 and 2, and adhesive 3, but additionally comprises the flexible strip 9 functioning as a flexible adhesive limiting member, or glue dam, extending between the structures 1 and 2 and along the longitudinal side of the joint. By using this strip 9, the front line surface 4 is formed to be concave, instead of convex. The front line surface 4 meets each of the structures 1 and 2 at an obtuse angle (cf. $\alpha$ in FIG. 2), whereby no notches are formed between the front line surface 4 and the structures 1 and 2.

The strip 9 may be attached by e.g. a double sided tape, glue or a staple to the structure 2 at the longitudinal strip edge 10. As the structure 1 is pressed against structure 2 and adhesive 3 during preparation of the joint, the free longitudinal strip edge 11 is contacted to the structure 1, whereby the strip 9 is elastically deformed by bulging outwards, towards the adhesive 3, forming the front line surface 4 of the adhesive 3 such that it is made concave.

The strip 9 may be removed from the joint after the adhesive has assumed a solid form, provided that no notches are formed in the front line surface 4 during the removal, but it may be preferred to leave the strip in the joint after the preparation of the joint in order to ensure that the front line surface is not disturbed, i.e. does not get any notches, and in order to simplify the preparation of the joint.

Figure 7:
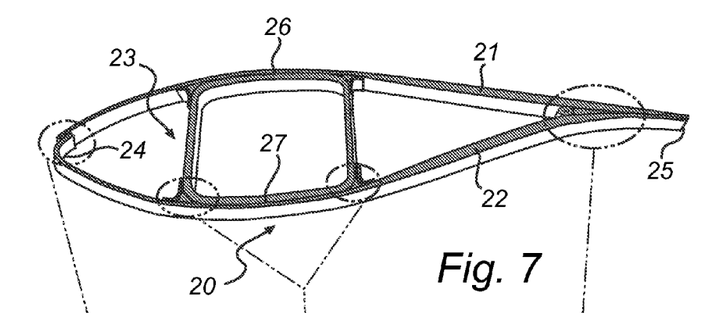
FIG. 7 is an illustration of a transverse cross section of a wind turbine rotor blade having joints according to the invention.

FIG. 7 is a schematic illustration of a transverse section 20 of a wind turbine rotor blade. The blade from which section 20 was extracted may be e.g. 40 meters long, having a similar transverse cross section as the section 20 along almost its entire length. The rotor blade section 20 comprises shell members 21 and 22, supported by a spar 23, which shell members 21 and 22 are bound to each other at the leading edge 24 of the rotor blade and at the trailing edge 25 of the rotor blade. The shell members 21 and 22 are also bound to the supporting spar 23 on respective sides 26 and 27 of the spar.

Figure 7A:
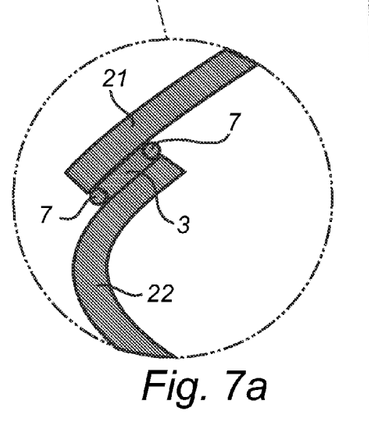
Figure 7B:
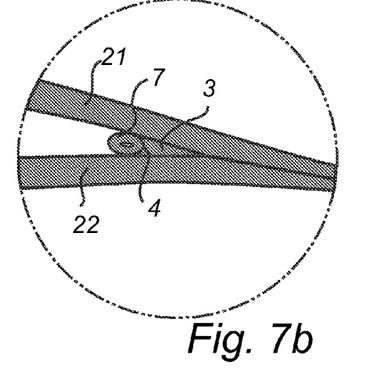
Figure 7C:
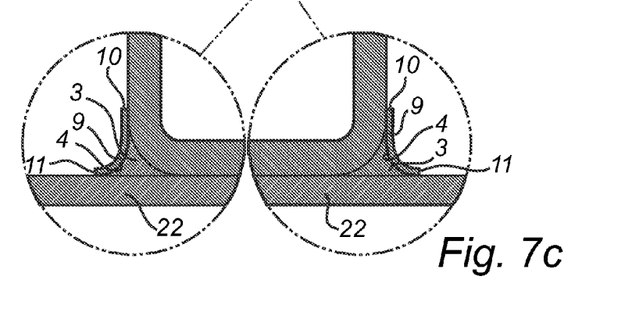

The illustration, FIG. 7, thus illustrates three different types of joints. At the leading edge 24, a lap joint of the present invention is used to bind the two shell members 21 and 22 to each other (see FIG. 7a), and at the trailing edge 25, a different kind of lap joint of the present invention is used to bind the two shell members 21 and 22 to each other (see FIG. 7b). Further, at each of the sides 26 and 27 of the spar, the spar is bound to respective shell member 21 or 22 by means of butt joints of the present invention (see FIG. 7c).

Figure 9A:
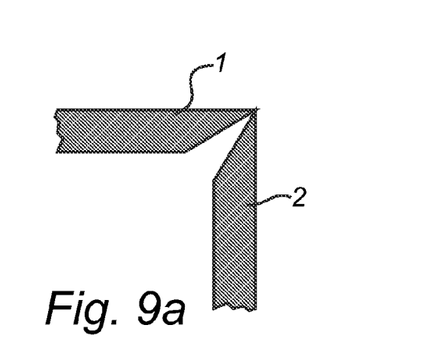
FIG. 9 is a schematic cross sectional view of a type of "L" shaped joint of the invention.
Figure 9B:
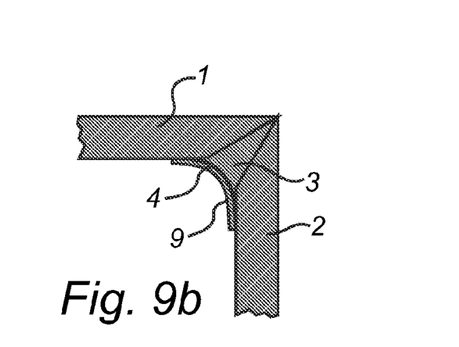
Figure 10A:
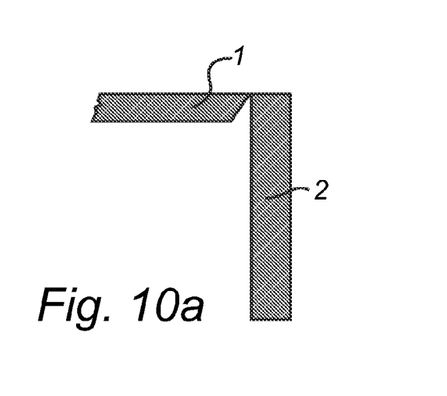
FIG. 10 is a schematic view of an other type of "L" shaped joint of the invention.
Figure 10B:
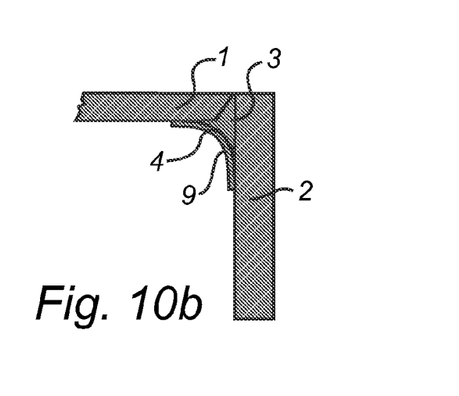

Now a few other embodiments of the present invention will be exemplified with reference to FIGS. 8 to 10 wherein joints in transversal cross sections are viewed.

FIG. 8 discloses an assembly in the form of a butt joint, of an other type than discussed with reference to FIGS. 5 and 6.

Figure 8A:
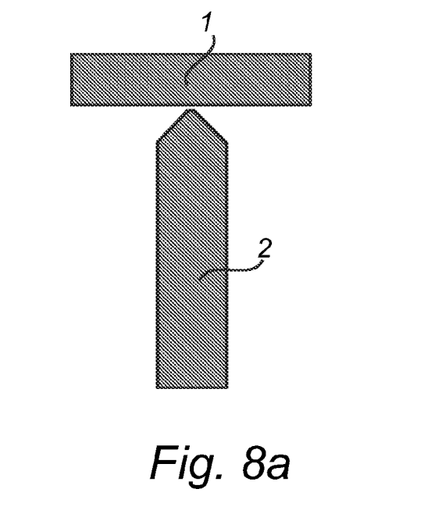
FIG. 8 is a schematic cross sectional view of another type of butt joint of the invention.

In FIG. 8a, two structures 1 and 2 which are to be bound to each other in the butt joint are lain out in the "T" configuration they should be bound in, with an edge of structure 2 connected to a flat surface of structure 1.

Figure 8B:
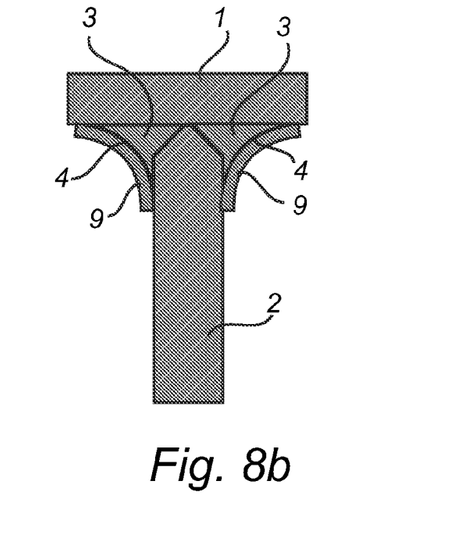

In FIG. 8b, the structures have been bound to each other in the "T" configuration by means of an adhesive 3. In order to obtain the concave adhesive front line surfaces 4 of the present invention, two strips 9 are used as flexible adhesive limiting members.

In this assembly, as opposed to the inventive assemblies of FIGS. 2, 4, 6, 9 and 10, the structures 1 and 2 in combination with the adhesive limiting members 9 form two channels which are filled with adhesive 3, guiding and shaping the adhesive 3.

FIG. 9 discloses an assembly where chamfered edges of two structures 1 and 2 are bound to each other in an "L" shaped joint.

In FIG. 9*a*, the two structures 1 and 2 which are to be bound to each other in the joint are lain out in the "L" configuration they should be bound in.

In FIG. 9*b*, the structures have been bound to each other in the "L" configuration by means of an adhesive 3. In order to obtain the concave adhesive front line surface 4 of the present invention, a strip 9 is used as a flexible adhesive limiting member.

FIG. 10 also discloses an "L" shaped joint, but in this joint, only the edge of one of the structures is chamfered.

In FIG. 10*a*, the two structures 1 and 2 which are to be bound to each other in the joint are lain out in the "L" configuration they should be bound in.

In FIG. 9*b*, the structures have been bound to each other in the "L" configuration by means of an adhesive 3. In order to obtain the concave adhesive front line surface 4 of the present invention, a strip 9 is used as a flexible adhesive limiting member.

The use of the flexible adhesive limiting member having a convex surface to be in contact with the adhesive when forming a joint, so as to create the concave surface may be particularly suitable when the surfaces that are to be connected are positioned at a certain distance at the location of the joint. In this event the joint will have a relatively large extension at the front line surface. The flexible adhesive limiting member here functions as a glue dam, preventing leakage of glue out from a defined space and ensuring that the front line surface of the joint has a concave shape. The concave shape ensures that the occurrence of stress concentration at the front line surface is reduced. For joints having a relative large extension at the front line surface in a direction across the length extension of the joint, the formation of a front line surface having a concave shape reduces the stress concentration significantly, in relation to front line surfaces having a random shape. The extension is measured from a contact between a first surface to be joined and the joint to a contact between second surface to be joined and the joint, at the front line surface of the joint.

Hence the use of the flexible adhesive limiting member having a convex surface to be in contact with the adhesive when forming a joint, so as to create the concave surface may be particularly suitable when the surfaces that are to be connected are positioned at a certain distance at the location of the front line surface of the joint such as when the surfaces to be joined open up at a side of the joint where the adhesive limiting member is positioned. In these embodiments, such as for example the embodiments shown in FIGS. 4, 6, 8, 9, and 10 the surfaces to be joined are positioned at an angle with respect to each other at the location of the adhesive limiting member. Due to the surfaces being at an angle with each other, the joint may have a relatively large extension from surface to surface, in comparison to joints formed between coplanar surfaces. The inclusion of a flexible adhesive limiting member forming a concave front line surface of the adhesive ensures that the joint may be formed in a controlled manner also for joints of this type.

It should however be noted that a beneficial effect is also present for joint having small extension as well as a large extension and for joints where the surfaces are coplanar as well as opening.

In order to define the shape of front line surface, the flexible member should have a sufficient structural rigidity to maintain a convex shape at the border to the joint during slight compression of the adhesive. This is for example achieved by resilient materials such as a closed cell foam. Examples include, but are not limited to, closed cell polyethylene and foamed nitrile rubber. The material may suitably be porous to air while being non porous to the adhesive. In this manner removal of air from the space at which the joint should be formed is facilitated. This may be achieved by the use of perforated membranes, which may be used in connection with a more rigid backing member, which also may be perforated.

The invention has mainly been described above with reference to a few embodiments. However, as is readily appreciated by a person skilled in the art, other embodiments than the ones disclosed above are equally possible within the scope of the invention, as defined by the appended patent claims. As specific examples, the present invention is not limited to any material or shape of the flexible adhesive limiting member or of the structures bound to each other at the inventive joint, nor is the present invention limited to any specific adhesive.

The invention claimed is:

1. A method of preparing an assembly, comprising:
   providing a first structure;
   providing a second structure;
   providing at least one flexible adhesive limiting member extending between the structures; and
   providing an adhesive between the structures to bind the structures to each other; wherein the adhesive is limited by the flexible adhesive limiting member such that a concave front line surface of the adhesive is defined.

2. The method according to a claim 1, wherein the first and second structure and the at least one flexible adhesive limiting member are arranged to form at least one channel for guiding and shaping the adhesive.

3. The method according to claim 1, wherein the flexible adhesive limiting member is removed after curing of the adhesive.

4. The method according to claim 1, wherein the flexible adhesive limiting member is attached to the first structure and abut, during elastic deformation, the second structure.

5. The method according to claim 1, wherein the flexible adhesive limiting member is a flexible tubing.

6. The method according to claim1, wherein the flexible adhesive limiting member has been produced from a closed cell foam, such as from closed cell polyethylene or from foamed nitrile rubber.

7. The method according to claim 1, wherein the structures are bound to each other by the adhesive to form a lap joint.

8. The method according to claim 1, wherein the structures are bound to each other by the adhesive to form a butt joint.

9. The method according to claim 1, wherein the first and second structures are shell members of a wind turbine rotor blade, the shell members being bound to each other by the adhesive at the leading edge or at the trailing edge of the wind turbine rotor blade.

10. The method according to claim 1, wherein one of the first and the second structure is a shell member of a wind turbine rotor blade, and the other one of the first and the second structure is a spar, or a spar cap, of a wind turbine rotor blade.

11. An assembly comprising a first and a second structure, said structures being bound to each other by means of an adhesive, said adhesive having a concave front line surface; and, a flexible adhesive limiting member extending between said structures and defining said concave front line surface of the adhesive.

12. A wind turbine rotor blade comprising an assembly according to claim 11.

13. A wind turbine comprising an assembly according to claim 11.

* * * * *